United States Patent [19]

Tani et al.

[11] Patent Number: 4,837,649
[45] Date of Patent: Jun. 6, 1989

[54] IMPROVEMENTS TO ROTATING HEAD ASSEMBLY IN A VIDEO TAPE RECORDING MACHINE

[75] Inventors: Toyofumi Tani; Hiroshi Miwa, both of Amagasaki, Japan

[73] Assignee: Mitsubishi Denki Kabushiki Kaisha, Tokyo, Japan

[21] Appl. No.: 20,224

[22] Filed: Feb. 27, 1987

Related U.S. Application Data

[63] Continuation of Ser. No. 645,664, Aug. 30, 1984.

[30] Foreign Application Priority Data

Sep. 21, 1983 [JP] Japan ............................. 58-147203[U]

[51] Int. Cl.$^4$ .......................... G11B 5/48; G11B 5/027; G11B 15/60
[52] U.S. Cl. ........................ 360/104; 360/84; 360/130.24
[58] Field of Search ................. 360/84, 102, 104, 107, 360/129, 130.22, 130.23, 130.24

[56] References Cited

U.S. PATENT DOCUMENTS

| | | | |
|---|---|---|---|
| 4,100,585 | 7/1978 | Van Slageren | 360/130.23 |
| 4,459,627 | 7/1984 | Kitagawa et al. | 360/130.24 |
| 4,603,359 | 7/1986 | Narasawa et al. | 360/130.24 |
| 4,611,255 | 8/1987 | Ushiro et al. | 360/84 |
| 4,725,910 | 2/1988 | Kaku et al. | 360/130.24 |

FOREIGN PATENT DOCUMENTS

| | | | |
|---|---|---|---|
| 41832 | of 1981 | Japan . | |
| 0195361 | 12/1982 | Japan | 360/130.24 |
| 58-737 | of 1983 | Japan . | |

OTHER PUBLICATIONS

Hauke et al., Tape Lifter For Rotating Head Tape Recorder, Feb. 1976.
Albrecht et al. Experiments on the Dynamic Response of a Flexible Strip to Moving Loads.
Morio et al., "Development of an Extremely Small Video Taperecorder", IEEE Transactions on Consumer Electronics, vol. CE—27, No. 3, Aug. 1981.

Primary Examiner—A. J. Heinz
Assistant Examiner—Andrew L. Sniezek
Attorney, Agent, or Firm—Lowe, Price, LeBlanc, Becker & Shur

[57] ABSTRACT

A rotational magnetic head apparatus comprises a fixed drum, a rotational drum mounted rotatably about the same axis as that of the fixed drum and having an opening formed on the end surface of the rotational drum facing the fixed drum, and a magnetic head provided in the opening. A tape is wound partly around the outer periphery of the fixed and rotational drums so that the tape is caused to travel while the magnetic head slides on the magnetic tape. The position of the magnetic head is selected to be in the center between the opposing surface of the opening facing the fixed drum and the opposing surface of the fixed drum.

3 Claims, 3 Drawing Sheets

PRIOR ART

PRIOR ART  MEASURING POINT

IMPROVEMENTS TO ROTATING HEAD ASSEMBLY IN A VIDEO TAPE RECORDING MACHINE

This application is a continuation of application Ser. No. 645,664, filed Aug. 30, 1984.

BACKGROUND OF THE INVENTION

1. Field of the Invention

The present invention relates to a rotational magnetic head apparatus. More specifically, the present invention relates to an improvement in the mounting of a magnetic head an upper or middle drum rotating system.

2. Description of the Prior Art

FIGS. 1 and 2 are views showing one example of a conventional rotational head apparatus. Specifically, FIG. 1 shows a perspective view of a conventional rotational head apparatus and FIG. 2 is an enlarged side view showing the vicinity of a magnetic head in the conventional rotational head apparatus.

The conventional rotational magnetic head apparatus comprises a fixed drum 4, a rotational drum 2 of the same diameter as that of the fixed drum 4 rotatably mounted on the fixed drum with the axes aligned, and a magnetic head provided within an opening formed at the end surface of the rotational drum 2 facing the fixed drum 4. A magnetic tape 3 is adapted to travel, with the same wound partly around the periphery of the rotational drum and the fixed drum 4.

The opening 5 formed at the end surface of the rotational drum 2 facing the fixed drum is defined by the uppermost or bottom surface 6 facing the opposing end surface 7 of the fixed drum 4, and the side walls. A guiding offset portion 8 is formed on the outer periphery of the fixed drum 4. The rotational drum 2 is adapted to be rotated in the direction of arrow 9. Travel of the magnetic tape 3 is shown by a broken line and, in the case of the apparatus shown, the direction x indicates the traveling direction of the magnetic tape 3. The direction y shows a direction perpendicular to the travel direction x of the magnetic tape 3. The height or depth of the opening 5 formed in the rotational drum 2 in the direction y is shown by the reference character H and is hereinafter referred to as the opening height in this specification. The distance between the upper edge of the magnetic head 1 and the uppermost surface 6 of the opening 5 facing the fixed drum 4 is denoted by the reference character $l_1$. The uppermost surface 6 of the opening 5 is hereinafter referred to as the uppermost end surface of the opening in this specification. The distance between the lower end of the magnetic head 1 and the opposing end surface 7 of the fixed drum 4 is denoted by the reference character $l_2$. The opposing end surface 7 of the fixed drum 4 is hereinafter referred to as the upper end surface of the fixed drum 4. The distance between the lower end surface of the rotational drum 2 facing the fixed drum 4 and the upper end surface 7 of the fixed drum 4 is denoted by the reference character $l_3$. The opposing end surface of the rotational drum 2 facing the fixed drum 4 is hereinafter referred to as the lower end surface of the rotational drum 2. In conventional apparatuses, it was a common practice that a consideration is given such that the distances $l_2$ and $l_3$ may be substantially the same.

Conventionally, the distance $l_2$ was selected to be within an upper limit of a certain magnitude for the purpose of stabilization of the travel of a magnetic tape. On the other hand, there was no particular restriction as to the distance $l_1$ and typically the distance $l_1$ was selected to be as large as more than two times the distance $l_2$ in conventional examples.

With a conventional rotational magnetic head apparatus of such structure, when the rotational drum 2 is rotated in the direction of the arrow 9, the magnetic tape 3 is caused to travel, with one side end of the tape in contact with the guiding offset portion 8 and the tape 3 partly wound around the periphery of the fixed drum 4 and the rotational drum 2 for a predetermined angle, while the magnetic head 1 is sliding on the surface of the tape 3. Since, the magnetic head 1 slightly protrudes from the outer peripheral surface of the rotational drum 2, deformation is caused in the magnetic tape 3. Investigation of such deformation of the magnetic tape 3 in the vicinity of the magnetic head 1 indicates that the magnetic tape 3 is deformed as shown in FIGS. 3 to 5. Specifically, FIG. 3 is a view showing three dimensionally the deformation of the magnetic tape in the vicinity of the magnetic head of a conventional rotational magnetic head apparatus, FIG. 4 is a view showing in a contour line manner the deformation of the magnetic tape in the vicinity of the magnetic head of a conventional rotational magnetic head apparatus, wherein with the outer peripheral surface of the rotational drum 2 as a reference, convex deformation from the outer periphery surface is shown in a solid line and a concave deformation inward of the outer peripheral surface is shown by a broken line, and FIG. 5 is a graph showing dislocation of the magnetic tape in the sections along the line A—A and the line B—B in FIG. 4. A deformed convex portion 10 protruding at the center shown in FIG. 3 is caused by influence of the magnetic head 1 and the deformation amount is increased or decreased in accordance with the magnitude of the protruding amount of the magnetic head 1 from the outer peripheral surface of the rotational drum 3 and generally exhibits a locally deformed state in which only a portion very close to the magnetic head 1 is deformed. In such a case, a deformed concave portion 11 is caused conversely at the foot area of the deformed convex portion 10 caused by the magnetic head 1. The state of the deformation is converted to a representation in terms of a contour line and the same is shown in FIG. 4, together with the indication of the positions of the respective corresponding drums. In the figure, the solid line in the center shows a contour line of the deformed convex portion 10 of the magnetic tape 1 and the dotted line shows the deformed concave portion 11 of the magnetic tape 1, and a two dotted line shows a contour lines of the rotation drum 2 and the fixed drum 4 corresponding to FIG. 2. It is seen that in such a case, the central points of these deformations do not appear on one line but, as shown in FIG. 4, two deformed concave portions 11 are formed in the portions close to the upper end of the opening 5 of the rotational drum 2.

As a result, the contour line of the deformed convex portion 10 is distorted at the right upper portion and the left upper portion of the contour line due to an influence by the deformed concave portions 11, with the result that an accurate (an elliptical) arch is not formed. In order to investigate in more detail a mutual positional relation of the deformation of the magnetic tape 3 with respect to the magnetic head 1, the dislocation of the magnetic tape at the positions of the sections shown by one dotted lines A—A and B—B in FIG. 4 was investigated and the result is shown in FIG. 5. The deformation at the section A—A is shown by the curve a and the deformation at the section B—B is shown by the curve b. The measuring point in the abscissa was determined in the direction y with the position of the magnetic head 1 as the origin 5. It would be appreciated from the curve b that the deformed state of the deformed convex portion 10 is asymmetrical as to the rotational drum side (the right side as viewed in FIG. 5) and as to the fixed drum side (the left side as viewed in FIG. 5), with the position of the magnetic head 1 being the most protruding portion as a reference. This shows that a contact state of the magnetic tape 3 with the magnetic head 1 is asymmetrical and, considering the fact that the track position (the gap position) on the magnetic head 1 comes approximately in the center of the magnetic head and the track width is as small as several tens $\mu$m, degradation of a recording and reproducing state has been caused due to the so called "unbalanced contact". However, such degradation is not preferred.

FIG. 6 is a diagrammatic view showing a contact state of the magnetic tape with the magnetic head. More specifically, since the distance $l_1$ as compared with the distance $l_2$ is too large, deformation of the magnetic tape 3 becomes uneven in the y axis direction (the height direction) with respect to the magnetic head 1 and therefore the spacing between the magnetic tape 3 and the magnetic head 1 becomes large at the position of the head track 12, as shown in FIG. 6, with the result that a recording and reproducing state is degraded. Conventionally, such problems were solved by improving the shape of the end of the magnetic head 1; however, control of the end shape of the magnetic head is extremely difficult and expensive.

SUMMARY OF THE INVENTION

Accordingly, a principal object of the present invention is to provide a rotational magnetic head apparatus which can provide a best recording and reproducing state.

Briefly described, in accordance with the present invention, the position of the magnetic head is selected to be in the center between the opposing surface of the opening of the rotating drum facing the fixed drum and the opposing surface of the fixed drum facing the rotational drum.

As a result, necessity to improve the shape of the magnetic head is eliminated and a rotational magnetic head apparatus capable of providing a preferred recording and reproducing state and hence with a high quality is provided with an inexpensive cost.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
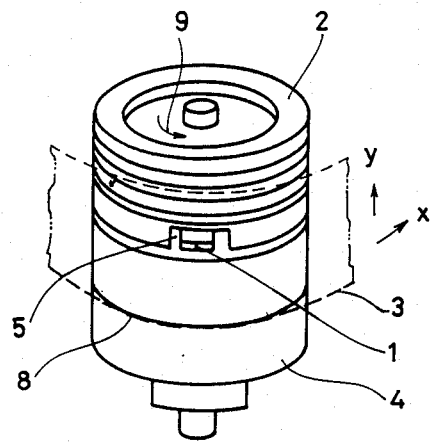
FIG. 1 is a perspective view of a conventional rotational magnetic head apparatus.
Figure 2:
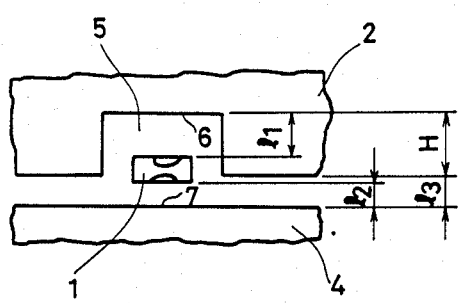
FIG. 2 is an enlarged side view of a portion in the vicinity of a magnetic head of a conventional rotational magnetic head apparatus.
Figure 3:
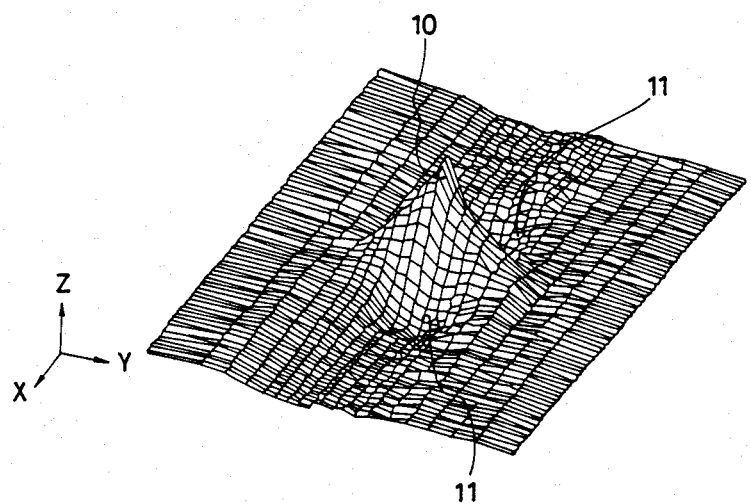
FIG. 3 is a characteristic view showing in a three dimensional manner the deformation of a magnetic tape in the vicinity of a magnetic head of a conventional rotational magnetic head apparatus.
Figure 4:
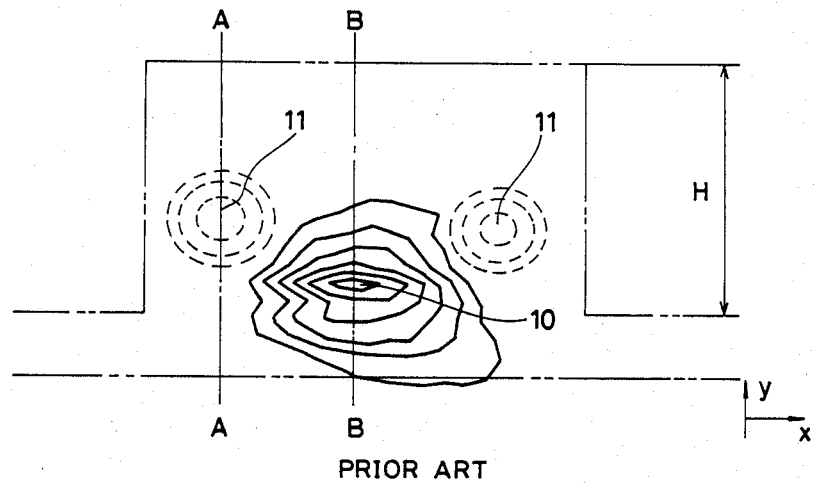
FIG. 4 is a characteristic view showing in a contour line manner the deformation of the magnetic tape in the vicinity of the magnetic head of a conventional rotational magnetic head apparatus.
Figure 5:
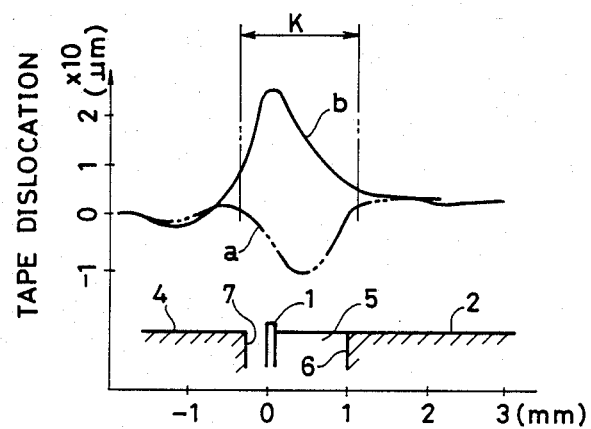
FIG. 5 is a graph showing the deformation of the magnetic tape at the sections taken along the lines A—A and B—B in FIG. 4.
Figure 6:
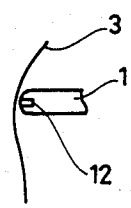
FIG. 6 is a diagrammatic view showing a contact state of the magnetic tape with the magnetic head in a conventional apparatus.
Figure 7:
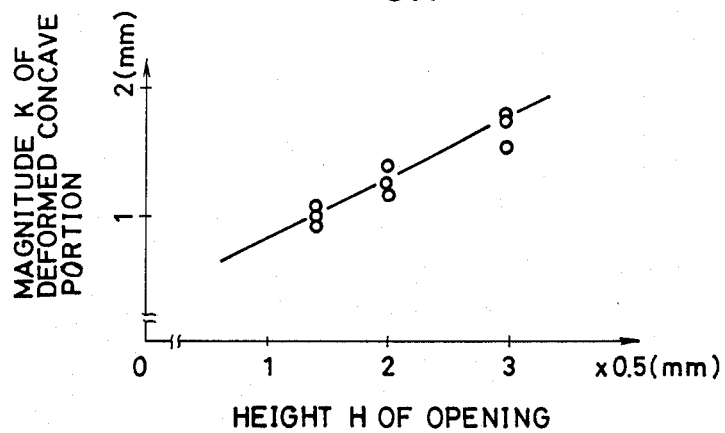
FIG. 7 is a graph showing the relation between the height (H) of the opening and the length (K) of the deformed concave portion of the magnetic tape.

FIG. 7 is a graph showing the relation between the height (H) of the opening and the length (K) of the deformed concave portion of the magnetic tape. More specifically, referring to FIG. 5, the curve a of the deformed concave portion 11 of the magnetic tape 1 comes approximately in the center between the uppermost end surface 6 of the opening of the rotational drum and the upper end surface 7 of the fixed drum and, therefore, it is seen that a relation between the length (K) in the direction y of the deformed concave portion 11 and the height (H) of the opening of the rotational drum are in a proportional relation, as shown in FIG. 7. Accordingly, it is preferred to select the distance $l_1$ and $l_2$ to be equal to each other. Deeming $l_2 \approx l_3$, then it is preferred to select the distances $l_1$ and $l_3$ to be equal to each other.

Figure 8:
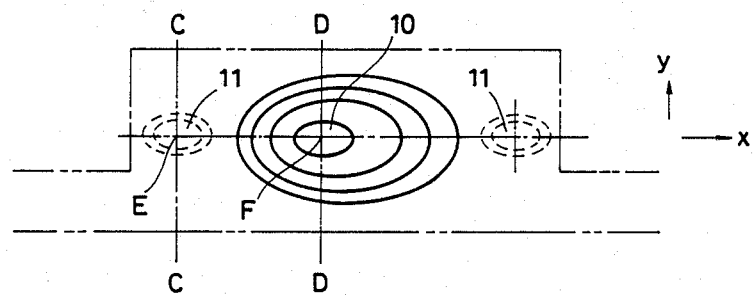
FIG. 8 is a characteristic view showing in a contour line manner the deformation of the magnetic tape in the vicinity of the magnetic head of a rotational magnetic head in accordance with the present invention.

FIG. 8 is a characteristic view showing in a contour line manner the deformation of the magnetic tape in the vicinity of the magnetic head of a rotational magnetic head apparatus in accordance with the present invention, in which the distances $l_1$ and $l_2$ are selected to be substantially the same.

Figure 10:
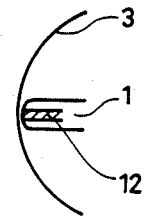
FIG. 10 is a diagrammatic view showing a contact state of the magnetic tape with the magnetic head in the rotational magnetic head apparatus in accordance with the present invention.
Figure 9:
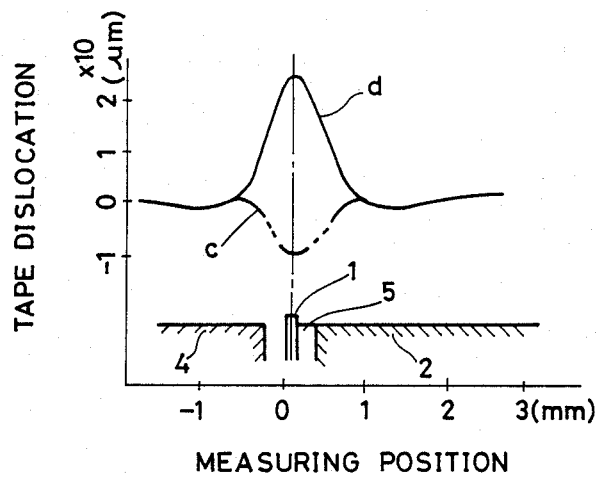
FIG. 9 is a graph showing the displacement of the magnetic tape at the sections taken along the lines C—C and D—D in FIG. 8.

FIG. 9 is a graph showing the deformation of the magnetic tape at the sections taken along the lines C—C and D—D in FIG. 8, in which the curve c shows the deformation at the section C—C and the curve d shows the deformation at the section D—D. As shown in FIG. 8, the center position E in the y direction of the deformed concave portion 11 and the center position F in the direction y of the deformed convex portions 11 come on a line. As a result, as shown in FIG. 9, the central lines of the curves C and D both come to be consistent with the position of the magnetic head 1. As a result, the deformation of the magnetic tape 3 becomes symmetrical on the y axis with respect to the magnetic head 1, so that a contact state of the magnetic tape 3 with the magnetic head 1 becomes best. FIG. 10 is a diagrammatic view showing a contact state of the magnetic tape with the magnetic head in a rotational magnetic head apparatus of the present invention. The positions of the magnetic tape 3 and the magnetic head are symmetrical on the y axis with respect to the position of the head track 12. As a result, the spacing between the magnetic tape 3 and the magnetic head 1 becomes a minimum value at the position of the head track 12, so that a heat recording and reproducing state can be attained.

In order to make the distances $l_1$ and $l_2$ be equal to each other, the magnetic head 1 may be moved to be located in the center between the uppermost end surface 6 of the opening of the rotational drum and the upper end surface 7 of the fixed drum or the height (H) of the opening may be selected such that the distance between the uppermost end surface 6 of the opening of the rotational drum and the upper end surface of the magnetic head 1 may be equal to the distance between the upper end surface 7 of the fixed drum and the lower end surface of the magnetic head 1.

In the foregoing the embodiment was described which is of a drum structure of an upper rotational drum and lower fixed drum; however, the present invention is not limited to such embodiment and may be employed in a drum structure of a middle rotational drum type of the β system. The present invention may be further employed in such a rotational magnetic head apparatus in which the travel direction of a magnetic tape and the rotational direction of a rotational drum are reversed to each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a rotational magnetic head apparatus of a drum rotating system including a fixed drum having a guiding offset portion for guiding a magnetic tape along an outer periphery of the fixed drum; said fixed drum also including an annular end surface, a rotational drum having an end surface facing said fixed drum and mounted for rotation about a central longitudinal axis of said fixed drum, said rotational drum having an opening formed on said end surface facing the annular end surface of said fixed drum, said opening having an uppermost surface extending generally parallel to the end surface of said rotational drum, a magnetic head and means for mounting said magnetic head to the apparatus in said opening of said rotational drum, said tape being wound around the outer periphery of said fixed drum and said rotational drum at a predetermined angle for travel in sliding contact with said magnetic head, the improvement wherein the position of said magnetic head is selected to be in the center between and in relation to said uppermost surface of said opening of said rotational drum facing said fixed drum and said annular end surface of said fixed drum opposing said uppermost surface, such center positioning of the magnetic head resulting in alignment in a travel direction of the head of a convex deformation in the tape with adjacent forward and rearward concave deformed tape portions, caused by said head, with a central longitudinal axis extending parallel to sides of said tape.

2. The head apparatus of claim 1, wherein the distance between the uppermost surface of the opening in the rotational drum and an upper end surface of the magnetic head is approximately equal to the distance between the annular end surface of the fixed drum and a lower end surface of the magnetic head.

3. The head apparatus of claim 2, wherein said mounting means is used to mount said magnetic head to the rotational drum.

* * * * *